Feb. 27, 1934.   J. H. JAMES   1,948,817
METHOD OF FRACTIONING PARTIAL OXIDATION PRODUCTS
Filed Nov. 8, 1928
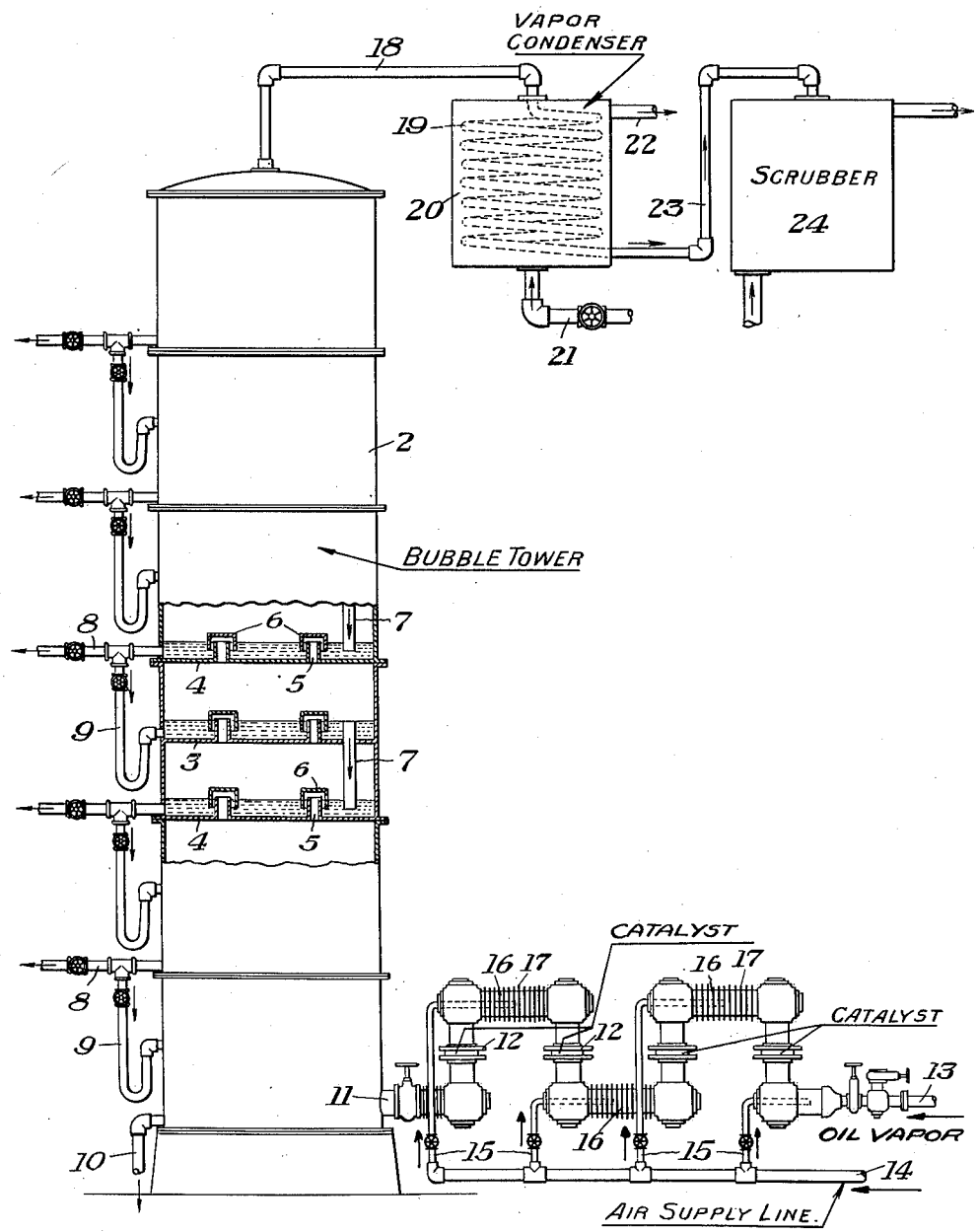

Patented Feb. 27, 1934

1,948,817

UNITED STATES PATENT OFFICE 1,948,817

METHOD OF FRACTIONING PARTIAL OXIDATION PRODUCTS

Joseph Hidy James, Pittsburgh, Pa., assignor to Clarence P. Byrnes, trustee, Sewickley, Pa.

Application November 8, 1928. Serial No. 318,077

6 Claims. (Cl. 260—116)

The figure is a diagrammatic side elevation, partly broken away, showing one form of apparatus for carrying out my invention. In various patent applications, such as Serial No. 272,567, filed January 22, 1919, and Serial No. 435,355, filed January 6, 1921, I have described a process for the vapor phase catalytic oxidation of aliphatic and napthenic hydrocarbons.

There are certain difficulties incident to the distillation of such condensed liquid products into fractions, some of these being that the heavier bodies, such as oxygenated organic acids contained in the mixture along with alcohols, aldehydes, ketones, esters, ethers, etc., are liable to undergo thermal decomposition, thus decreasing their value. This is particularly true as to the heavier fractions or bodies. Furthermore, with the lighter portions of the product side reactions occur in continued heating which lower the yield of desired bodies or compounds and render it difficult to separate the oily mixture product into narrow fractions.

The present invention is designed to reduce or overcome these difficulties, and consists in fractionally condensing the vapor mixture as it comes from the oxidizing apparatus. It also consists in passing the vapor mixture from the outlet of the oxidizer to a fractioning column, and thence to a double-surface condenser, and thence preferably to a scrubber where certain portions may be absorbed by a liquid absorbing medium.

In the drawing, in which one form of apparatus is shown, 2 indicates generally a bubble tower having six sections superimposed on each other, each section containing two separating partitions 3 and 4 with the usual upward tubes 5 and bubble caps 6. From the intermediate partition in each section an overflow pipe 7 leads down to the next partition. The condensate may be drawn out from the bottom of each chamber through a valved pipe 8 having a valved branch 9 by which a portion may, if desired, be led down into the upper compartment of the next lower section. From the lowest compartment the valved pipe 10 leads to a suitable condensate container.

In this drawing I show a four-screen pipe form of oxidizer, having a valved vapor-gas outlet 11 which enters the base of the bubble tower or fractioning column. In the oxidizer, 12 represents annular castings holding catalytic screens, the vapor entering the first catalytic chamber through the valved pipe 13. 14 represents a compressed air supply pipe from which valved branches 15 lead into the nipples connecting the catalyst chambers. The end portions of these pipes may be perforated and the air enters in a counter-current direction so that a good mixture is obtained before reaching the screens.

The amount of air admitted is regulated to give the desired temperature and air proportioning, and the temperature of the vapor mixture is preferably lowered in passing from one screen to the next. For this purpose the nipples 16 are preferably provided with projecting fins 17 to increase the air cooling effect. The finned nipples preferably cool the vapors down to about 350° C. and the heat of reaction in the catalysts restores the temperature to, say, about 410° C. These temperatures will, of course, vary with the fractions employed for raw material. More or less screens may be employed as desired. This multiple screen type is such as generally shown in my copending application, Serial No. 435,355, above referred to.

From the top of the bubble tower a vapor outlet pipe 18 leads to a vapor condenser consisting, as shown, of a coil pipe 19 within a chamber 20 having a valved liquid inlet 21 at the bottom and outlet 22 at the upper portion thereof. From the lower end of this condenser a vapor pipe 23 leads to one or more scrubbers, indicated at 24, in which the mixture is brought into direct contact with a liquid, such as the liquid product of the oxidation or a portion thereof.

In carrying out my method the vapor mixture of intermediate oxidation products, together with nitrogen, a small amount of free oxygen, carbon dioxide, and carbon monoxide, are passed into the lower part of the fractioning column wherein fractioning will occur. Depending upon the temperature of the exit mixture and whether the fractioning column be insulated on the one hand or artificially cooled in any desired manner on the other hand, a greater or less fractioning may be obtained therein. I preferably arrange this column so that the most volatile condensible fraction will liquefy in the vapor condenser.

Owing to the low partial pressure at which the very volatile compounds exist in the gas-vapor stream, it is important to provide an absorber or scrubber beyond the vapor condenser in which I may circulate any suitable absorbing liquid. I prefer to use as this absorbing liquid in the scrubber or scrubbers certain liquid intermediate oxidation mixtures which may vary as demanded by the working up of oxidation products from a given oil. For example, if in the oxidation of "gas oil" a fraction is obtained which is of no material commercial value, this can be set aside as a scrubber oil for absorbing these light ends of the mixture. After such absorption has taken place, the scrubber oil can be heated to distill out the absorbed products, and then either returned to the scrubber or absorber or added to stock for re-running through the oxidizer.

As the gas vapor stream enters the lower end of the fractioning column it rises in counter-current direction therethrough, thus giving a heat interchange relationship between the vapor and liquid whereby the less volatile components are condensed and the more volatile components in the condensate may be re-vaporized. The various fractions may be tapped off from the several sections and any desired part of the tapped-out portion from one section may be fed down into the next.

After passing through the fractioning tower, the gas vapor stream enters the vapor condenser, which may be of any desired type, this condensing the most volatile condensible fractions. Thence the non-condensible portions of the stream pass through the scrubber or scrubbers wherein they are absorbed as above recited.

If a naptha is being oxidized in the oxidizing apparatus, the temperature of the column sections is preferably maintained so that, for example, the lower column sections will catch fractions boiling over 180° C. and so on, up to the decomposition point of the heavy acids which are contained, this being in the neighborhood of 300° to 325° C. The temperature of the column sections is regulated so as to obtain five or six cuts or fractions varying from 60° C. to 180° C. The very volatile condensible products will be condensed into the vapor condenser and the remaining products obtained by absorption in the scrubber or scrubbers.

The advantages of my invention result from the fractional condensation of the gas vapor stream coming from the oxidizing apparatus, thereby avoiding the difficulties inherent in condensing the entire product and then distilling it to fractions of different average molecular weights.

Fractioning towers of different kinds may be employed, the oxidation apparatus may be varied, and other changes may be made without departing from my invention.

I claim:

1. In the partial oxidation of hydrocarbons, the steps consisting of feeding a mixture of finely divided hydrocarbon and an oxygen-containing gas through a hot reaction zone, chemically tying oxygen into the hydrocarbon and thereafter passing the exit stream in contact with a series of separate oil layers containing oxidation products, maintaining the oil layers at different temperatures, and condensing bodies of different average molecular weights in said different layers.

2. In the partial oxidation of hydrocarbons, the steps consisting of feeding a mixture of finely divided hydrocarbon and an oxygen-containing gas through a hot reaction zone, chemically tying oxygen into the hydrocarbon, thereafter passing the exit stream upwardly through successive chambers of a fractioning column and bringing the stream into contact with successive liquid layers, maintaining the oil layers at different temperatures, and condensing fractions of different average molecular weights.

3. In a partial oxidation of hydrocarbons, the steps consisting of feeding a mixture of finely divided hydrocarbon and an oxygen-containing gas through a hot reaction zone, chemically tying oxygen into the hydrocarbon, and thereafter bubbling the exit stream through a series of separate liquid layers containing oxygen derivatives of hydrocarbons, maintaining the oil layers at different temperatures, and thereby condensing fractions of different average molecular weights in said layers.

4. In the partial oxidation of hydrocarbons, the steps consisting of feeding a mixture of finely divided hydrocarbon and an oxygen-containing gas through a hot reaction zone, chemically tying oxygen into the hydrocarbon and thereafter passing the exit stream in contact with a series of separate oil layers containing oxidation products, maintaining the oil layers at different temperatures, condensing bodies of different average molecular weights in said different layers, and then passing the stream through a vapor condenser out of contact with a liquid.

5. In the partial oxidation of hydrocarbons, the steps consisting of feeding a mixture of finely divided hydrocarbon and an oxygen-containing gas through a hot reaction zone, chemically tying oxygen into the hydrocarbon and thereafter passing the exit stream in contact with a series of separate oil layers containing oxidation products, maintaining the oil layers at different temperatures, condensing bodies of different average molecular weights in said different layers, passing the stream through a vapor condenser out of contact with a liquid, and thereafter bringing the stream in contact with an absorption liquid.

6. In the partial oxidation of hydrocarbons, the steps consisting of feeding a mixture of finely divided hydrocarbon and an oxygen-containing gas through a hot reaction zone, chemically tying oxygen into the hydrocarbon and thereafter passing the exit stream in contact with a series of separate oil layers containing oxidation products, maintaining the oil layers at different temperatures, condensing bodies of different average molecular weights in said different layers, then passing the stream through a vapor condenser out of contact with a liquid, and then condensing remaining vapors.

JOSEPH HIDY JAMES.